Patented Sept. 1, 1931

1,821,759

UNITED STATES PATENT OFFICE

PAUL LAEUGER, OF BASEL, SWITZERLAND, ASSIGNOR TO THE FIRM OF J. R. GEIGY S. A., OF BASEL, SWITZERLAND

MANUFACTURE OF AZO DYESTUFFS

No Drawing. Application filed June 27, 1929, Serial No. 374,290, and in Switzerland July 30, 1928.

Pyrazolones of 4'-amino-4-hydroxy-diphenylmethane-3-carboxylic acids or their derivatives have not been used till up to-day for the manufacture of azo-dyestuffs.

Now, it has been found that it is possible to obtain from such pyrazolones azo-dyestuffs capable of being after-chromated, the dyeings of which are distinguished by their remarkable properties of fastness, especially to light and fulling.

The present invention consists in coupling a diazo-compound with the methyl pyrazolone from 4'-amino-4-hydroxy-diphenylmethane-3-carboxylic acid of the formula:

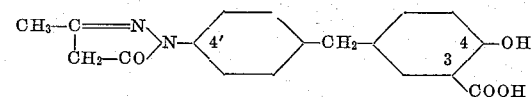

The product thus obtained dyes wool, when after-chromated, a yellow to orange tint of remarkable fastness.

Advantageously, the coupling is effected on the methyl pyrazolone from 4'-amino-4-hydroxy-5-methyl-diphenyl methane-3-carboxylic acid, and as diazo compound the 1-diazo benzene-4-sulphonic acid is preferably used, but it is also possible to employ another diazo-compound, such as for example 1-diazobenzene-3-sulphonic acid, 2-diazo-4-nitro-1-phenol, 2-diazo-4-chlorine-1-phenol, aniline-2:5-disulphonic acid, para-amino-salicylic acid, ortho-amino-salicylic-sulphonic acid and so on.

The following example illustrates the process, the parts being by weight:

17.3 parts of sulphanilic acid are diazotized and coupled in weakly soda-alkaline solution with 33.8 parts of the methyl-pyrazolone from 4'-amino-hydroxy-5-methyl-diphenyl methane-3-carboxylic acid of the formula:

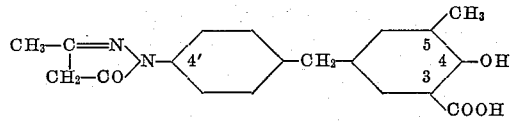

When the copulation is achieved, the mass is warmed up and the formed dyestuff is salted out and dried. The dyestuff has the formula:

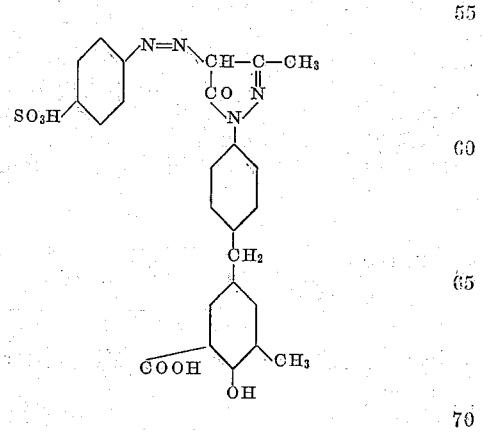

and constitutes a brown-yellow powder dyeing wool in acid bath a beautiful yellow showing, when being after-chromated, excellent properties of fastness.

The methyl pyrazolone from 4'-amino-4-hydroxy-5-methyl-diphenyl methane-3-carboxylic acid can be obtained by treating the corresponding diazo-compound with sodium sulphite according to a known method and condensing the 4'-hydrazino-4-hydroxy-5-methyl-diphenyl methane-3-carboxylic acid with aceto-acetic acid ester in acetic acid solution. The pyrazolone thus obtained constitutes a snow-white powder (in form of small leaves or flakes) which is easily soluble in aqueous alkalies and sodium acetate solutions and shows a fusion point of 228°–230° C.

An analogous example is that wherein the 2-diazo-4-nitro-1-phenol is coupled with the methyl pyrazolone from 4'-amino-4-hydroxy-diphenyl methane-3-carboxylic acid of the formula:

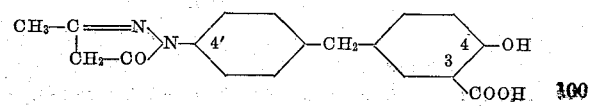

The dyestuff obtained according to this modification has the formula:

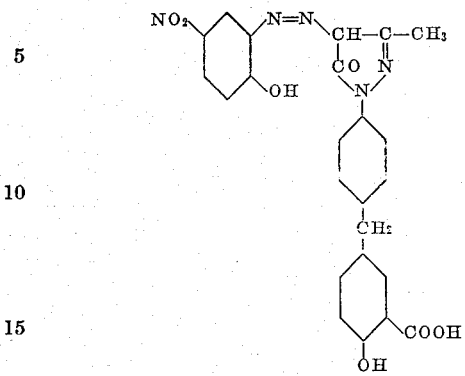

and dyes wool in an acid bath orange tints with a somewhat brownish shade. This orange dyeing is very fast.

What I claim is:—

1. A process for the manufacture of azo-dyestuffs, consisting in coupling a diazo-compound of the phenyl series with the methyl pyrazolone from 4'-amino-4-hydroxy-diphenyl methane-3-carboxylic acid of the formula:

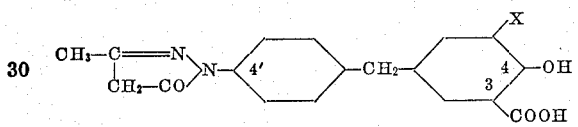

wherein X represents a hydrogen or methyl-group.

2. A process for the manufacture of an azo-dyestuff, consisting in coupling the 1-diazobenzene-4-sulphonic acid with the methyl pyrazolone from 4'-amino-4-hydroxy-5-methyl diphenyl methane-3-carboxylic acid of the formula:

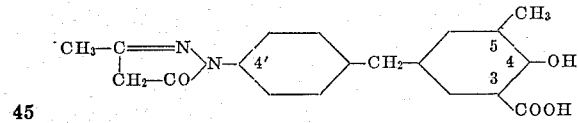

3. As a new article of manufacture, the herein described dyestuff having the formula:

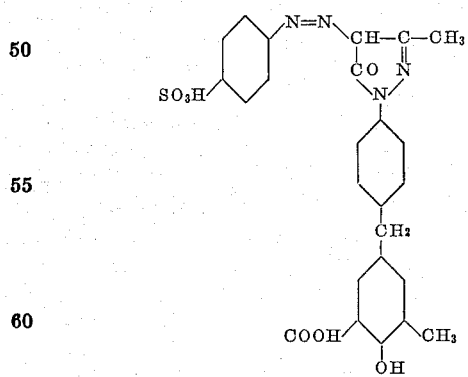

and which is obtained by coupling the 1-diazobenzene-4-sulphonic acid with the methyl pyrazolone from 4'-amino-4-hydroxy-5-methyl diphenyl methane-3-carboxylic acid of the formula:

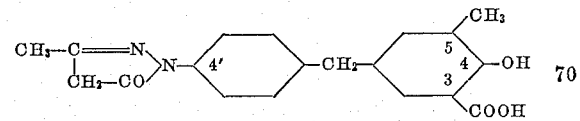

said dyestuff dyeing wool, when after-chromated, yellow tints of remarkable fastness.

In witness whereof I have hereunto signed my name this 17th day of June, 1929.

PAUL LAEUGER.